Patented Sept. 17, 1940

2,215,055

UNITED STATES PATENT OFFICE 2,215,055

METHOD FOR PREPARING HIDES USING MOLD TRYPTASES, AND A NEUTRAL TO WEAKLY ACID REACTION

Otto Röhm, Darmstadt, Germany

No Drawing. Application October 8, 1938, Serial No. 234,048

8 Claims. (Cl. 195—6)

The invention relates to a method of preparing hides or skins with the aid of mold tryptases, using a neutral to weakly acid reaction.

The present application is a continuation-in-part of my application Serial No. 70,890, filed March 25, 1936, now Patent No. 2,132,579, issued October 11, 1938. In said application there is described a method for preparing hides which are ready to tan and which method consists in subjecting alkali-swelled skins or hides to a treatment with mold tryptases and a water-soluble bisulphite, that is, a substance capable of supplying $HSO_3$-ions, and, if desired, an ammonium salt, the method being carried out in a neutral to weakly acid solution.

It has now been found that in the production of hides, fresh, salted, or dried skins or hides can be treated advantageously without alkali pre-treatment with mold tryptases and substances which yield $HSO_3$-ions, e. g. a water-soluble bisulphite or sulphurous acid, with or without the addition of small amounts of alkaline reacting substances, the process being carried out in a neutral to weakly acid solution. The customary preliminary water soaking is eliminated by the new method, or else appreciably shortened.

The method may be practiced by using the mold tryptases in conjunction with ammonium salts. Dried hides can be advantageously treated direct with the mold tryptase and the addition agents mentioned, without any preliminary water soaking. In the case of salted hides, a short preliminary treatment with water may be used. But even the washing out of the common salt (NaCl) may be dispensed with.

It is surprising that it is possible in such a simple manner to convert even skins or hides which have not been preliminarly alkali treated into a condition ready for dehairing, by treatment with mold tryptase and a substance capable of supplying $HSO_3$-ions.

In accordance with the invention, the treatment of the skins and hides with mold tryptase and a substance capable of supplying $HSO_3$-ions, together, if desired, with further addition agents, can be carried out in any suitable manner, e. g. in a pit, in a fulling barrel, or by coating the hides with the treating material. The operation may be carried out at ordinary temperature or at a somewhat raised temperature. For example, hides coated with the treating material may be hung up at 25–30° C.

The tryptases used in accordance with the invention may be obtained from suitable molds, especially from the aspergillus varieties, e. g. *Aspergillus flavus*, *Aspergillus parasiticus*, *Aspergillus effusus*, *Aspergillus oryzae*, and *Aspergillus wentii*.

The method in numerous respects possesses advantages over the method set forth in my application Serial No. 70,890, now patent as noted supra. The elimination of the alkaline pre-swelling makes it possible to spare the skin and also serves to save one working step. The softening and hair-loosening operations may be combined into a single working step. So to speak the dehairing may be effected by the softening step, while yet sparing the skin. This is not possible to the same advantageous degree either with mold tryptase alone or with substances which supply $HSO_3$-ions when taken alone.

It is however also possible, within the scope of the invention, to supplement the treatment (i. e. involving the use of mold tryptase and a substance capable of supplying $HSO_3$-ions and with the procedure carried out in neutral to weakly acid solution) with an alkaline after-treatment prior to dehairing. For example, the treatment may be interrupted before the loosening of the hair is fully accomplished, and the process carried on in weakly alkaline reaction with the mold tryptase and using as an activator the sulphite formed from the bisulphite or sulphurous acid when the material is rendered alkaline.

The dehairing may be followed by an alkaline after-treatment with alkaline reacting salts or alkalies or alkaline earths, with or without the addition of other dehairing agents. The more or less thorough removal of these alkaline reacting compounds may be effected by a washing-out procedure or by the action of neutralizing or deliming agents. If desired, this procedure may be combined with a treatment with enzymes having a bating action.

*Example 1*

100 kg. salted cattle skins are fulled for one hour with:

Water of ordinary temperature_____liters__ 300

Thereupon,

Sodium bisulphite_____kilograms__ 2
Mold tryptase_____do____ 2 dissolved in 20 liters of water are added. The fulling is again repeated for one hour, whereupon the skins are allowed to rest until they are in a dehairable condition which, in general, takes about five days. The action is carried out at a pH value of 5.5 to 6. The skins are then dehaired and after-treated for one day with

| | Per cent |
|---|---|
| Water | 300 |
| Calcined soda (figured on the pelt weight) | 6 |

After removal from the soda solution, the hides are hung in cold water over night, then sheared, smoothed, and pickled or tanned without any subsequent bating.

Example 2

100 kg. salted cattle skins are washed for ½ to 1 hour with running water and laid over night in fresh water.

After this period, the skins are fulled in a barrel for an hour with a solution composed of:

| | | |
|---|---|---|
| Sodium bisulphite | kilograms | 2 |
| Mold tryptase | do | 2 |
| Water | liters | 300 | and then allowed to rest so long until they are in a dehairable condition. This occurs after about four days. The action takes place at a pH value of 5.5 to 6. The further treatment of the skins is effected as in Example 1.

Example 3

100 kg. of dried lamb skins are softened for 1 to 2 days with:

| | | |
|---|---|---|
| Water of ordinary temperature | liters | 1000 |
| Sodium bisulphite | kilograms | 4 |
| Mold tryptase | do | 4 |

Thereupon the skins are stretched and placed back into the same liquor. The action takes place at a pH value of 5.5 to 6. After 5 to 8 days all told, the skins are removed from the liquor, de-wooled, and after-treated with:

| | Per cent |
|---|---|
| Water | 300 |
| Calcined soda (figured on the pelt weight) | 6 | for from 1 to 5 days, depending on the kind of leather desired. After removal of flesh, smoothing and washing, the hides are pickled or tanned.

Example 4

Freshly removed sheep skins are sprayed with water on the fleshy side to remove blood and are then coated on the fleshy side with a solution consisting of:

| | Parts |
|---|---|
| Water | 10 |
| Mold tryptase | 2 |
| Sodium bisulphite | .2 | and stored in folded-together condition for 24 hours. The action takes place at a pH value of 5.5 to 6. After this time, a solution of:

| | Parts |
|---|---|
| Water | 10 |
| Calcined soda | 2 | is applied to the fleshy side. The hides are again folded together and stored for 1 to 2 days. They are then de-wooled and after-treated with:

| | Per cent |
|---|---|
| Water | 300 |
| Calcined soda (figured on the pelt weight) | 6 |

After one or more days the flesh is removed and they are washed and pickled or tanned.

In lieu of 6% calcined soda, it is also possible to use 6% of 25% ammonia, or 6% calcium hydroxide for the after-treatment.

The duration of the after-treatment is governed by the kind of leather desired. When lime is used, a deliming treatment is employed at the end with one of the known deliming agents, e. g. an ammonium salt. If desired, the deliming may also be combined with a weak enzymatic bating.

I claim:

1. A method of producing ready-to-tan hides, which comprises, as an initial step, treating fresh, salted, dried or partially water-soaked skins or hides with a mold tryptase in neutral to weakly acid solution with the addition of a substance which yields $HSO_3$-ions, in the absence of alkaline pre-treatment.

2. A method as set forth in claim 1, wherein the mold tryptase is obtained from an aspergillus variety.

3. A method as set forth in claim 1, wherein an ammonium salt is added to the treating bath.

4. A method wherein dried hides or skins are treated as set forth in claim 1 without any preliminary water-soaking.

5. A method wherein salted hides are treated as set forth in claim 1 after a short preliminary water treatment.

6. A method as set forth in claim 1, wherein the skins or hides are treated with an alkaline solution following treatment with mold tryptase.

7. A method as set forth in claim 1, wherein the skins or hides are treated with an alkaline solution following partial treatment with the mold tryptase but prior to dehairing.

8. A method as set forth in claim 1, wherein the skins or hides are treated with an alkaline solution following treatment with the mold tryptase and after dehairing has taken place.

OTTO RÖHM.

CERTIFICATE OF CORRECTION.

Patent No. 2,215,055.  September 17, 1940.

OTTO RÖHM.

It is hereby certified that error appears in the above numbered patent requiring correction as follows: In the heading to the printed specification, line 7, for "Serial No. 234,048" read --Serial No. 234,048. In Germany October 13, 1937--; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents.